United States Patent
Eom et al.

(10) Patent No.: US 10,139,312 B2
(45) Date of Patent: Nov. 27, 2018

(54) METHOD FOR SENSING REVERSE ROTATION OF ENGINE IN VEHICLE USING TOOTH PERIOD RATIO OF CRANKSHAFT

(71) Applicant: HYUNDAI MOTOR COMPANY, Seoul (KR)

(72) Inventors: Tae-Kwang Eom, Seoul (KR); Jung-Suk Han, Hwaseong-si (KR); Chang-Hyun Lim, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 287 days.

(21) Appl. No.: 15/287,177

(22) Filed: Oct. 6, 2016

(65) Prior Publication Data

US 2017/0176288 A1   Jun. 22, 2017

(30) Foreign Application Priority Data

Dec. 16, 2015   (KR) .................... 10-2015-0180403

(51) Int. Cl.
G01M 15/06   (2006.01)
G01M 15/05   (2006.01)
F02D 27/00   (2006.01)

(52) U.S. Cl.
CPC ............ G01M 15/06 (2013.01); G01M 15/05 (2013.01); F02D 27/00 (2013.01)

(58) Field of Classification Search
CPC ...... F02D 41/009; F02D 27/00; G01M 15/06; G01M 15/05; G01D 5/2457
USPC ....................................... 73/114.26
See application file for complete search history.

(56) References Cited

U.S. PATENT DOCUMENTS

2007/0245817 A1*  10/2007  Matsushima ......... F02D 41/009
                                                          73/114.26

FOREIGN PATENT DOCUMENTS

| JP | H08-261053 A | 10/1996 |
|---|---|---|
| JP | 2006-046236 A | 2/2006 |
| JP | 2008-014287 A | 1/2008 |
| JP | 2013-151878 A | 8/2013 |

(Continued)

OTHER PUBLICATIONS

Shinichi et al., Reverse rotation detection apparatus and reverse rotation method for internal combustion engine, Jun. 2007, European patent application, EP 1878897 A2, pp. 1-15.*

Primary Examiner — John Fitzgerald
Assistant Examiner — Truong D Phan
(74) Attorney, Agent, or Firm — McDermott Will & Emery LLP

(57) ABSTRACT

A method for sensing reverse rotation of an engine in vehicle includes: detecting tooth period ratios using a crankshaft angle detection sensor and storing the detected tooth period ratios in a buffer of an electronic control unit (ECU); calculating a tooth period ratio between a measured tooth period and a tooth period measured just before thereof; determining whether the tooth period ratio is greater than a first reference value; updating the tooth period value stored in the buffer by measuring the recent tooth period if the tooth period ratio is greater than the first reference value; calculating the tooth period ratio using the updated tooth period value; and determining a reverse rotation state of the engine by checking whether the change shows a predetermined pattern after a change in the value of the tooth period ratio is observed.

9 Claims, 11 Drawing Sheets

(56) References Cited

FOREIGN PATENT DOCUMENTS

| JP | 2013-194576 A | 9/2013 |
| JP | 2013-253614 A | 12/2013 |
| KR | 2003-0018901 A | 3/2003 |
| KR | 10-2015-0069931 A | 6/2015 |

* cited by examiner

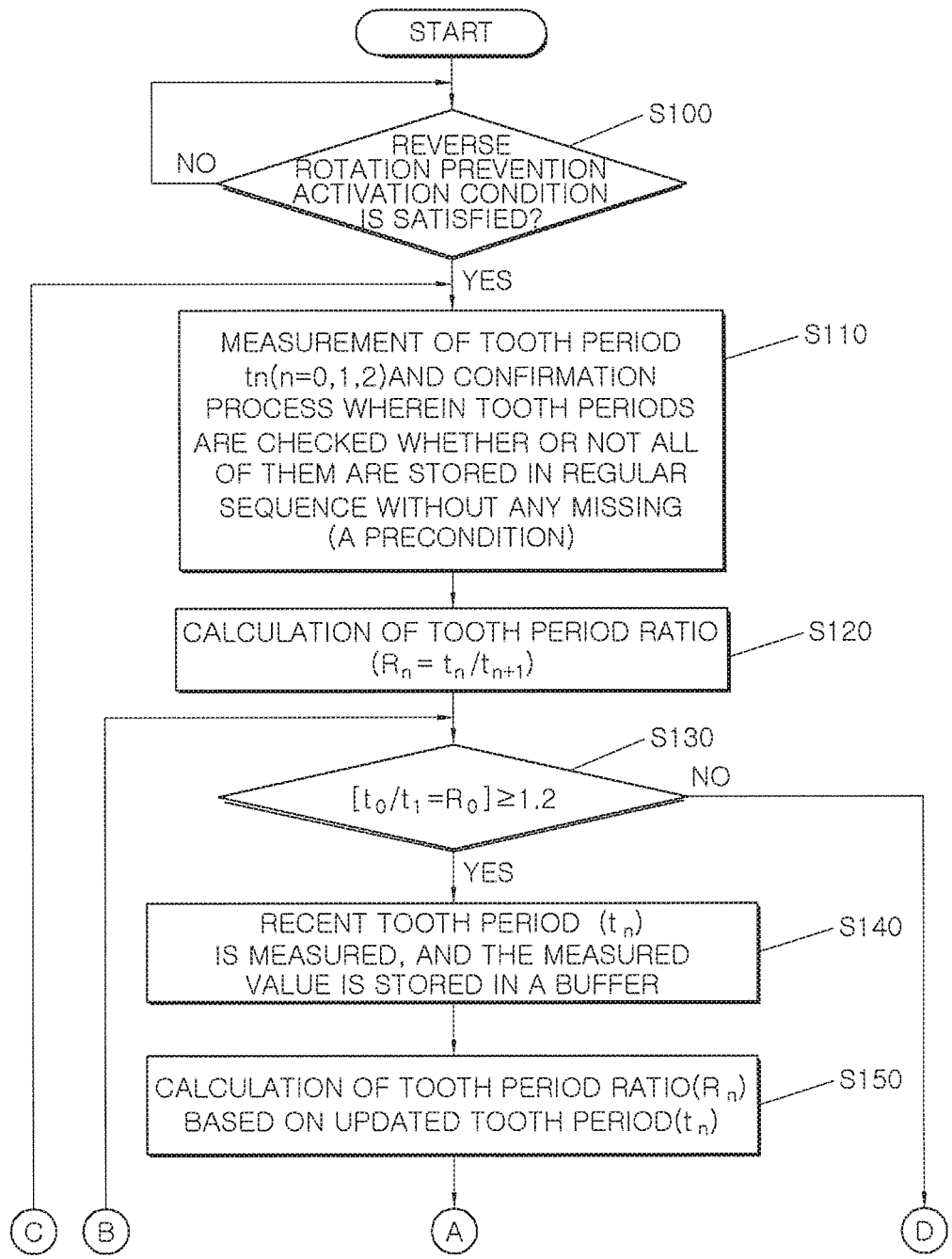

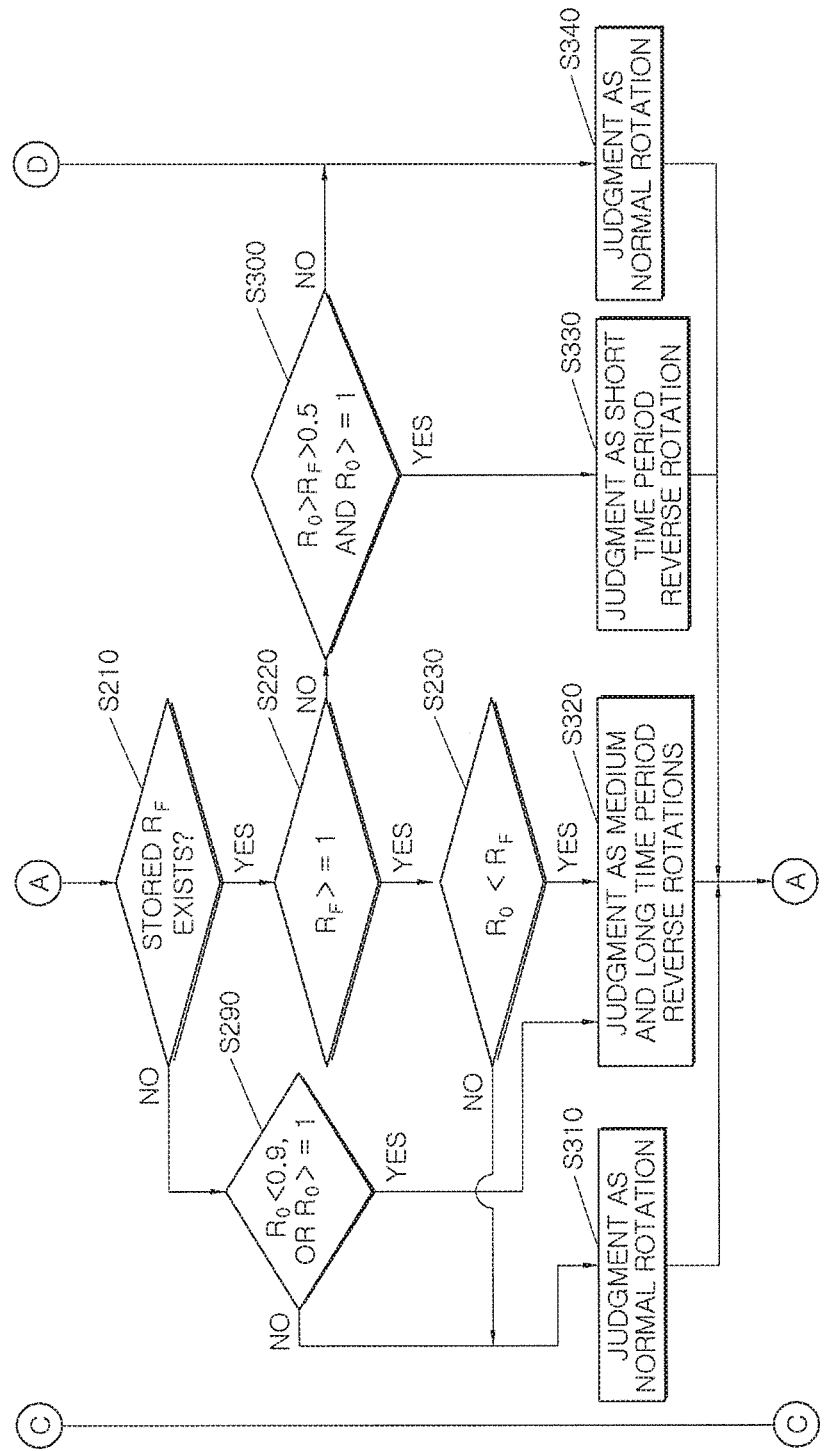

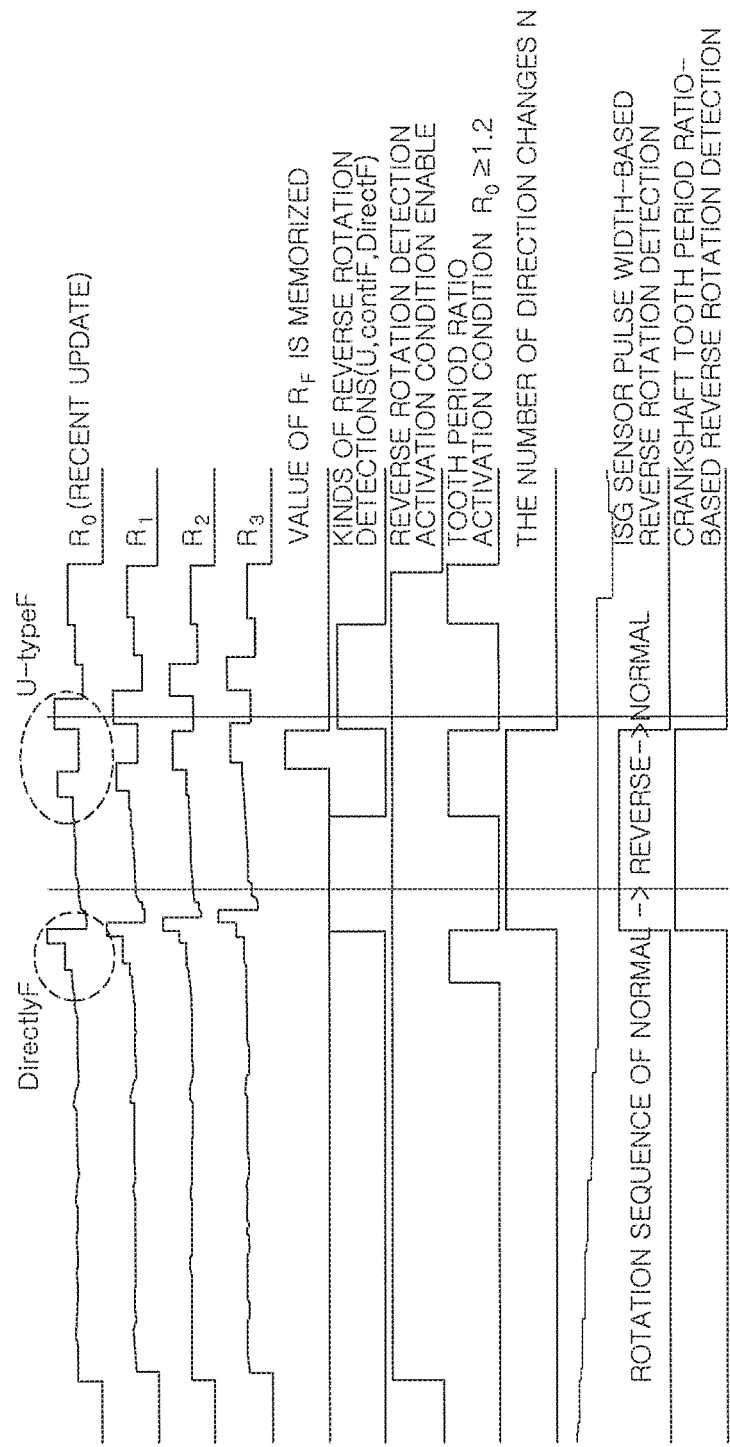

METHOD FOR SENSING REVERSE ROTATION OF ENGINE IN VEHICLE USING TOOTH PERIOD RATIO OF CRANKSHAFT

CROSS-REFERENCE(S) TO RELATED APPLICATIONS

This application claims the benefit of priority to Korean Patent Application No. 10-2015-0180403, filed on Dec. 16, 2015 which is incorporated herein by reference in its entirety.

TECHNICAL FIELD

The present disclosure relates to a method for sensing a reverse rotation of an engine, and more particularly to, a method for sensing a reverse rotation of an engine in a vehicle which equips with an idle stop and go (ISG) device configured to automatically stop the engine during an idle drive or a deceleration of the vehicle and automatically start the stopped engine.

BACKGROUND

In recent years, the use of the vehicle which equips with an idle stop and go (ISG) device is currently on the rise so as to satisfy a fuel efficiency enhancement demand. In the related art, a vehicle having an ISG device can be stopped by receiving information, for example, on a vehicle speed, a rotational speed of an engine, a cooling water temperature, a tip-in/tip-out of an acceleration pedal, an on/off of a brake penal, etc. The engine can be stopped if the engine maintains an idle state for a predetermined time period, thus enhancing fuel efficiency of the vehicle.

In case of such a vehicle which equips with the ISG device, the engine will start when a driver's start intention, for example, the operation of an acceleration pedal, etc. after the activation of the ISG device, is confirmed. In order to obtain start stability at the time of an engine start, it needs to carry out a synchronization control of the engine by accurately determining an angle of a crank when starting the engine.

FIG. 3 is a view illustrating a crankshaft angle detection device to measure a rotational angle of the crank. A sensor wheel 20 installed coaxial with a crankshaft 30 includes a plurality of teeth 21 on an outer circumference thereof. One or two teeth are missing from the teeth 21 so as to indicate a top dead point of the piston. A crankshaft angle sensor 10 is installed near the sensor wheel 20 so as to detect the presence of the teeth 21. The crankshaft angle sensor 10 is able to transmit a predetermined waveform signal, as illustrated in FIG. 2, by detecting the teeth which pass in front of the sensor during the rotation of the sensor wheel 20. Here, in the waveform, the time period from one falling edge to the next falling edge is called a tooth period (T). The rotational angle of the crankshaft 30 can be measured by analyzing the above-mentioned signal.

In case of the idle stop of the engine of the ISG device-mounted vehicle, an engine reverse rotation phenomenon may occur since the crankshaft fluctuates, for example, due to a friction, etc. between vehicle wheels and the ground before the engine completely stops (a stall). For this reason, in case of the ISG device-mounted vehicle, it is essential for the sake of a stable restart of the engine to accurately detect any reverse rotation and reverse rotation level of the engine at the time of the idle stop stage of the engine.

In order to determine any reverse rotation of the engine, according to the related art, information on a cam shape which can be measured using a tooth period measured by the crankshaft angle sensor or the information on a cam shape measured using a cam sensor.

SUMMARY

For a stable engine restart of an ISG device-mounted vehicle, it needs to accurately detect any reverse rotation and reverse rotation level of the engine at the time of an idle stop stage of the engine. For this detection, a tooth period measured using a crankshaft angle sensor would be used.

In case of a conventional reverse rotation detection algorithm, the engine reverse rotation is detected with the aid of the shape of a target wheel or an interaction formula which uses variables being different by kind of crankshaft angle detection sensor. For example, since a crankshaft angle detection sensor installed at the ISG device-mounted vehicle and the crankshaft detection sensor installed at the vehicle wherein the ISG device is not mounted may differ from each other. The variables of the interaction formulas used to determine the engine reverse rotation are different in both the vehicle.

To improve the above-mentioned problems, the control algorithm should be developed different for each kind of vehicles and each kind of the sensors employed in the vehicles, which consequently results in the increase of the work load when developing the vehicle control system.

In the reverse rotation detection algorithm of the conventional vehicle wherein the ISG device is not mounted, the above-described measurement is available only in case of the long time return wherein the reverse rotation is relatively long.

The range of the reverse rotation may be formed of a long time return, a short time return or a medium time return. Since it is hard to obtain a desired engine start stability even during the reverse rotation occurrence, it needs to develop a new algorithm which is able to cover all the ranges wherein the reverse rotations may occur.

An object of the present disclosure is to provide a method for sensing a reverse rotation of an engine in a vehicle which can be commonly employed in case where the kinds of vehicle and measurement sensors are different as compared to a conventional reverse rotation detection method, and any reverse rotation can be sensed covering all the ranges wherein the reverse rotations might occur.

The inventors of the present disclosure have studied on the reverse rotation phenomenon and analyzed the inertial force during the reverse rotation. The inventors have found out a new characteristic in a tooth period ratio, which characteristic can be commonly employed to various vehicles and detection sensors and can be obtained when the tooth periods which are different by shape of the engine target wheel or by kind of the crankshaft angle sensor are converted into a tooth period ratio which corresponds to a ratio between the current tooth period and the next tooth period.

More specifically, the inventors have found out a new characteristic that if the measured tooth period is converted into a tooth period ratio, the tooth period ratio would be in a range (about 0.8~1.2) of a constant value during compression and explosion strokes when the engine is rotating, but if the inertial force is removed, the range of the tooth period ratio may deviate out of the above-mentioned range. Moreover, the inventors have found that it is possible obtain a predetermined change aspect from a tooth period ratio based on a reverse rotation range irrespective of the kinds of the crankshaft angle sensors and the kinds of the target wheels.

The inventors have calculated a tooth period ratio based on the tooth period measured by the crankshaft angle sensor with the aid of the above-described result and have invented an engine reverse rotation detection method which is able to detect the reverse rotations in various ranges in such a way to use the simplified interaction formula on the tooth period ratio.

Other objects and advantages of the present disclosure can be understood by the following description, and become apparent with reference to the embodiments in the present disclosure. Also, it is obvious to those skilled in the art to which the present disclosure pertains that the objects and advantages of the present disclosure can be realized by the means as claimed and combinations thereof.

In accordance with an embodiment in the present disclosure, there is provided a method for sensing a reverse rotation of an engine in a vehicle wherein a pulse signal is received from a crankshaft angle detection sensor provided to detect a crankshaft angle of the engine, and a reverse rotation state of the engine in the vehicle is determined based on a tooth period ratio between a falling edge and the next falling edge of the pulse signal, which may include, but is not limited to, detecting a tooth period ratio ($t_n$) (n=0, 1, 2) using the crankshaft angle detection sensor and storing the detected tooth period ratios in a buffer of an ECU (Electronic Control Unit); calculating a tooth period ratio ($R_n$) which is a ratio between a measured tooth period ($t_n$) and a tooth period ($t_{n+1}$) measured just before the measured tooth period ($t_n$); determining whether the tooth period ratio ($R_n$) is over a first set value; updating the tooth period value which has been already stored in the buffer by measuring the recent tooth period if the tooth period ratio ($R_n$) is over the first set value; calculating the tooth period ratio ($R_n$) using the updated tooth period value; and determining a reverse rotation state of the engine by checking whether the change shows a predetermined pattern aspect after any change in the value of the tooth period ratio ($R_n$) is observed based on time.

The step for determining the reverse rotation state of the engine which may include determining whether or not there exists a section wherein the value of the tooth period ratio rises and then drops over time and storing the value ($R_F$) of the dropped tooth period ratio; updating the tooth period value already stored in the buffer by measuring again the recent tooth period and calculating a new tooth period ratio ($R_0$) using the updated tooth period value; and determining that if the value ($R_0$) of the new tooth period ratio is larger than the value ($R_F$) of the previous tooth period ratio, the engine has had a short time period reverse rotation (a short time return), wherein the direction change occurs at a time point which is less than $1/3$ of the time between a failing edge of the pulse signal and the next falling edge thereof.

The step for determining the reverse rotation state of the engine may further include determining whether or not there exists a section wherein the value of the tooth period ratio rises and then drops over time and storing the value ($R_F$) of the dropped tooth period ratio; updating the tooth period value already stored in the buffer by measuring again the recent tooth period and calculating a new tooth period ratio ($R_0$) using the updated tooth period value; and determining that if the value ($R_0$) of the new tooth period ratio is smaller than the value ($R_F$) of the previous tooth period ratio, the engine has had a medium time period reverse rotation (a medium time return), wherein the direction change occurs at a time point which is greater than or equal to $1/3$, but which is less than $2/3$ of the time between a falling edge of the pulse signal and the next falling edge thereof or the engine has had a long time period reverse rotation (a long time return), wherein the direction change occurs at a time point which is greater than or equal to $2/3$, but which is less than 3/3 of the time between a falling edge of the pulse signal and the next falling edge thereof.

There are further provided determining whether or not the updated recent tooth period ratio ($R_0$) and the tooth period ratio ($R_1$) just before the updated recent tooth period ratio ($R_0$) are over a predetermined second value; updating the tooth period values which have already stored in the buffer by measuring again the recent tooth periods if the updated recent tooth period ratio ($R_0$) and the tooth period ratio ($R_1$) just before the updated recent tooth period ratio ($R_0$) are larger than the predetermined second value and calculating a new tooth period ratio ($R_0'$) using the updated tooth period value; and determining that if the newly updated recent tooth period ratio ($R_0'$) is smaller than a predetermined third value or is equal to or larger than a predetermined fourth value, the medium time period or long time period reverse rotation has occurred.

If it is determined that the engine has had a reverse rotation, the method may further include counting the number of the reverse rotation judgments; and determining whether or not the number of the reverse rotation judgment is over 2 and determining whether or not the engine has had a reverse rotation by initializing the values of the tooth period ratios stored in the buffer if the number of the reverse rotation judgments is over 2.

The method may further include determining whether or not a reverse rotation detection of the engine has been activated based on the rotation speed of the engine, the vehicle speed and the engine start state.

The method may further include completing the reverse rotation detection of the engine based on the rotation speed of the engine and the engine start state.

The present disclosure provides a method for sensing a reverse rotation of an engine in a vehicle which can be commonly employed to various vehicles without additionally doing a predetermined correction work for each kind of a target wheel and a crankshaft angle sensor and has a good reverse rotation detection performance as compared to a conventional reverse rotation detection algorithm Moreover, it is possible to detect a reverse rotation of an engine for a relatively shorter time period, which was impossible in the conventional reverse rotation detection method.

Since it is possible to quickly and accurately determine a crank position for an engine synchronization, an engine start stability can be enhanced during a procedure wherein an ISG device-mounted vehicle restarts after the idle stop.

BRIEF DESCRIPTION OF THE DRAWINGS

FIGS. 1A-1D are a flow chart illustrating a method for sensing a reverse rotation of an engine according to an exemplary embodiment in the present disclosure.

FIG. 8 is a graph showing a result of another detection after a method for sensing a reverse rotation of an engine is carried out according to the present disclosure.

DETAILED DESCRIPTION OF SPECIFIC EMBODIMENTS

Figure 1B:
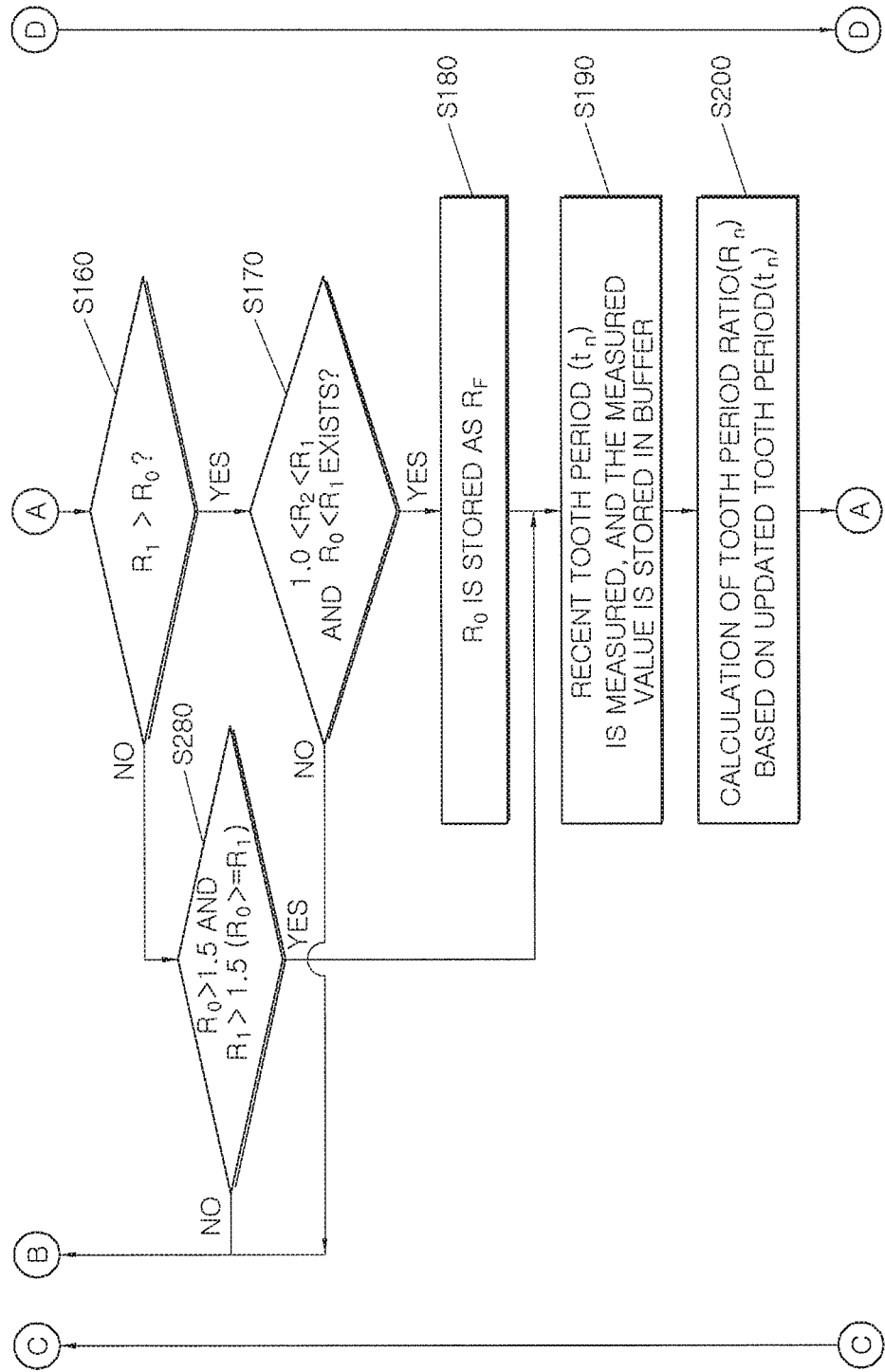
Figure 1D:
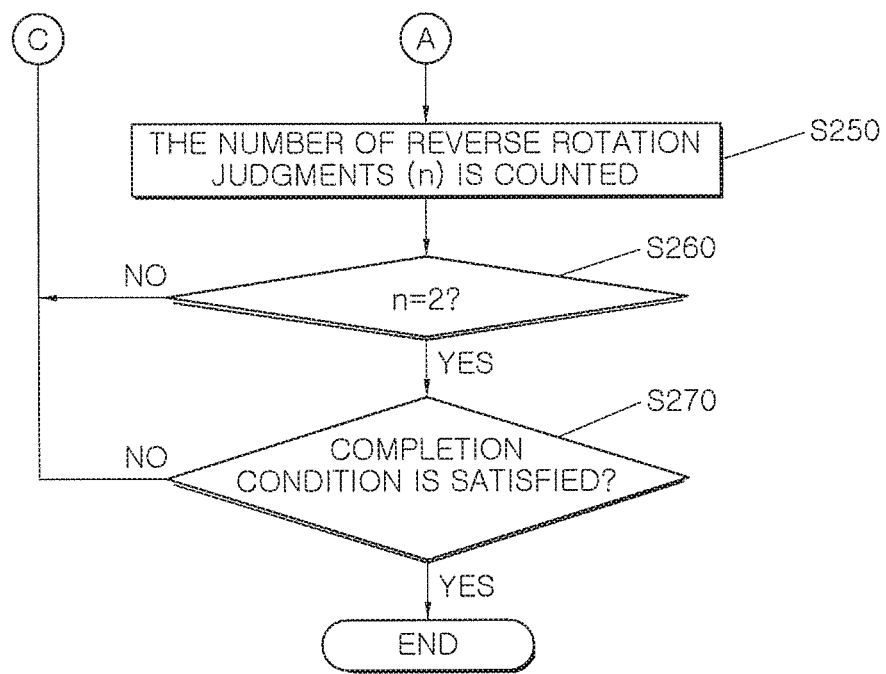

The terms and words used in the specification and claims should not be construed as their ordinary or dictionary sense. On the basis of the principle that the inventor can define the appropriate concept of a term in order to describe his/her own disclosure in the best way, it should be construed as meaning and concepts for complying with the technical idea of the present disclosure. Accordingly, the embodiments described in the present specification and the construction shown in the drawings are nothing but one embodiment in the present disclosure, and it does not cover all the technical ideas of the disclosure. Thus, it should be understood that various changes and modifications may be made at the time of filing the present application. In addition, detailed descriptions of functions and constructions well known in the art may be omitted to avoid unnecessarily obscuring the gist of the present disclosure. Exemplary embodiments in the present disclosure will be described below in more detail with reference to the accompanying drawings.

The embodiments in the present disclosure will be described in detail with reference to the accompanying drawings.

The present disclosure is directed to a method wherein a pulse signal is received from a crankshaft angle sensor provided to detect a crankshaft angle of the engine, and a reverse rotation state of the engine in the vehicle is determined based on a ratio change in accordance with a tooth period time between a falling edge of the pulse signal and the next falling edge.

Figure 3:
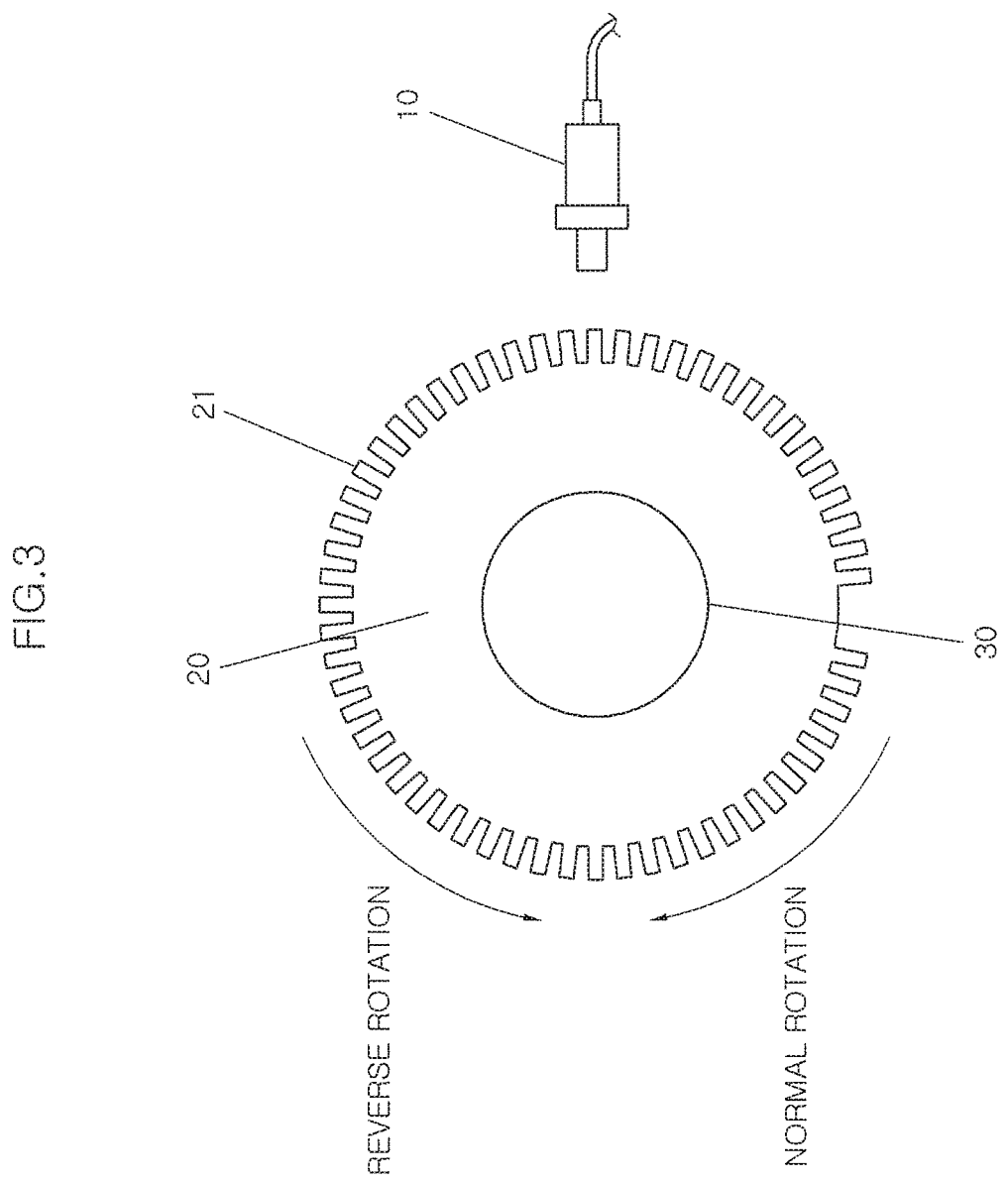
FIG. 3 is a view schematically illustrating a measuring device for measuring a rotation angle of a crankshaft.

FIG. 3 illustrates a crankshaft angle measuring device employed in the present disclosure. Referring to FIG. 3, a plurality of teeth 21 are formed on an outer circumference of the sensor wheel 20 provided coaxial with the crankshaft 30.

The crankshaft angle sensor 10 is disposed near the sensor wheel 20. The crankshaft angle sensor 10 of the ISG device-mounted vehicle may include as a hall sensor a hall voltage generator, a permanent magnet, a test circuit, etc. When the sensor wheel 200 passes in front of the crankshaft angle sensor 10, the magnetic field changes in response to the position (the positions of the teeth) of the sensor wheel 20, whereupon the magnetic field having an effect on the crankshaft angle sensor 10 will change, and the hall voltage will change thereby. The crankshaft angle sensor 10 is able to transfer the changes of this hall voltage to an electronic control unit (ECU) in the form of a waveform as in FIG. 2.

The teeth 21 are not formed all over the outer circumferences of the sensor hall 20, but they are formed partially missed. The crankshaft angle sensor 10 may recognize the above-mentioned missing portions as a missing tooth. The angle of the crankshaft can be determined at the current time since the crankshaft angle sensor 10 detects the number of the detected teeth formed at a synchronization revolving body and the detection time of the missing teeth.

Figure 2:
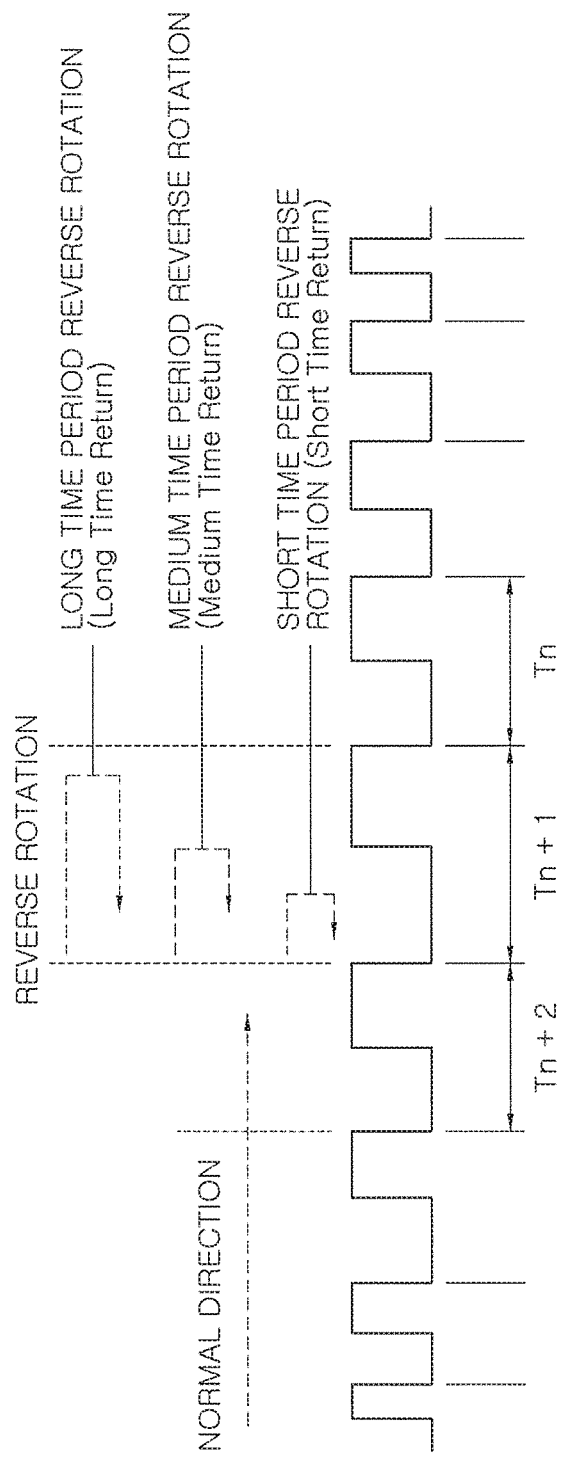
FIG. 2 is a view illustrating a signal waveform outputted from a crankshaft angle sensor.

FIG. 2 is a view illustrating a voltage waveform from e crankshaft angle sensor 10. The voltage waveform is formed in a type wherein the falling edge and the rising edge are periodically repeated. As illustrated in FIG. 2, the tooth period ($t_n$) means time from one falling edge to the next falling edge. If the subscript value is smaller, it means that the value is obtained more recently. Further, $t_0$ means a tooth period which was measured most recently, and $t_1$ means a tooth period measured just before $t_0$, and $t_2$ means a tooth period measured before $t_1$.

FIGS. 1A-1D are a flow chart illustrating a method for sensing a reverse rotation of an engine in a vehicle according to an exemplary embodiment in the present disclosure.

As illustrated in FIGS. 1A-1D, it is determined whether the reverse rotation detection algorithm of the vehicle of the present disclosure is activated (S100). As described earlier, when the engine of the ISG device-mounted vehicle is stopped idle, the crankshaft may fluctuate, and the engine may experience a reverse rotation phenomenon. If the above-mentioned phenomenon is not accurately detected, the engine synchronization may go wrong when the engine is restarted after the idle stop or the engine synchronization may be finished incomplete.

In case of the idle stop condition at the ISG device-mounted vehicle, it needs to activate the reverse rotation detection algorithm under the condition that the crankshaft receives a lot of external affects, for example, when the engine rotates at a low speed of below 500 rpm, and the engine is in the off state, and the vehicle speed is below 20 km/h.

If the reverse rotation detection algorithm is activated, the crankshaft angle sensor 10 will detect the teeth 21 formed at the sensor wheel 20 and will measure the tooth period ($t_n$). A result of the measurement is outputted to the control unit in the form of a specific pulse waveform, from which the most recent tooth period ($t_0$), the tooth period ($t_1$) before the tooth period ($t_0$), the tooth period ($t_2$) before the tooth period ($t_1$), etc. are obtained (S110). Here, all the tooth periods should be stored in a buffer without any missing thereof in a sequence in order to accurately detect a tooth period ratio.

Next, the tooth period ratio ($R_n$) which means a ratio from the tooth period ($t_n$) at one point to the tooth period ($t_{n+1}$) at the point before the above-mentioned point is calculated (S120).

According to the studies by the inventors of the present disclosure, the tooth period ratio ($R_n$) may be in a predetermined value range irrespective of the kinds of the target wheel and the kinds of the crankshaft angle sensor in case where the rotation is normally carried out by the compression and explosion strokes in the engine. The tooth period ratio ($R_n$) may be in near the following numeric range.

$$0.8 \leq R_n \leq 1.2 \quad (1)$$

When the ISG device-mounted vehicle is stopped idle, the inertial force is applied to the crankshaft in the typical rotation direction. In order to make the force, which is maintaining the inertial force to apply in one direction, rotate in another direction, the above force should overcome the typical inertial force. As illustrated in FIG. 2, for this reason, the tooth period will extend, and the tooth period ratio will increase as well.

If the tooth period ratio ($R_n$) is over a predetermined value range like in the above formula (1), it is possible to estimate that the engine has lost the inertial force, and the reverse rotation has occurred. In the present disclosure, it would be determined whether the calculated tooth period ratio is over a first set value (1.2 in the present disclosure) (S130), and if the calculated tooth period ratio is over the first set value, it is determined which range the reverse rotation has occurred in. Moreover, if the calculated tooth period ratio is smaller than the first set value, it would be determined as an operation wherein the engine is normally rotating (S250).

If it is determined that the tooth period ratio ($R_n$) is over the first set value, the recent tooth periods ($t_n$) are continuously measured, and the measured tooth periods are stored in the buffer of the ECU (S140). Moreover, the tooth period ratio ($R_n$) is calculated again from the updated tooth periods ($t_n$) (S150).

According to the studies and tests by the inventors of the present disclosure, when the engine has the reverse rotation, the change in the value of the tooth period ratio ($R_n$) has a specific aspect irrespective of the kinds of the target wheels and the kinds of the crankshaft angle sensors.

Figure 4:
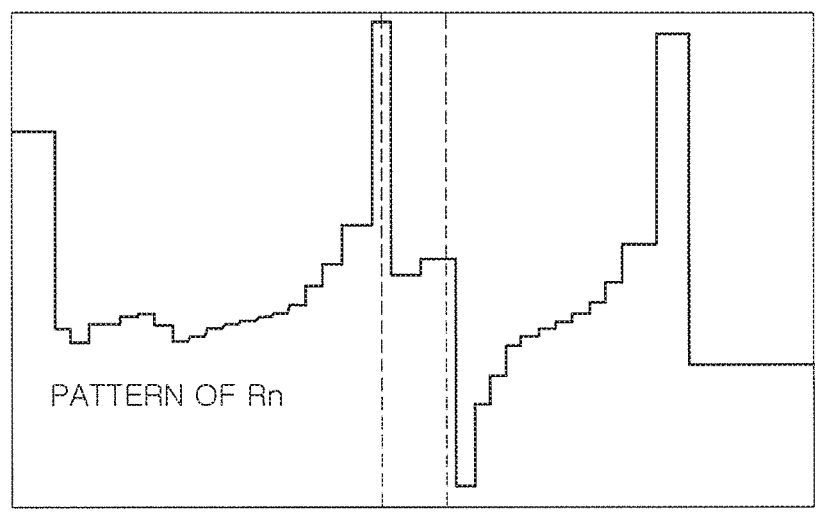
FIG. 4 is a graph showing a change aspect of a tooth period ratio based on a reverse rotation characteristic.
Figure 5:
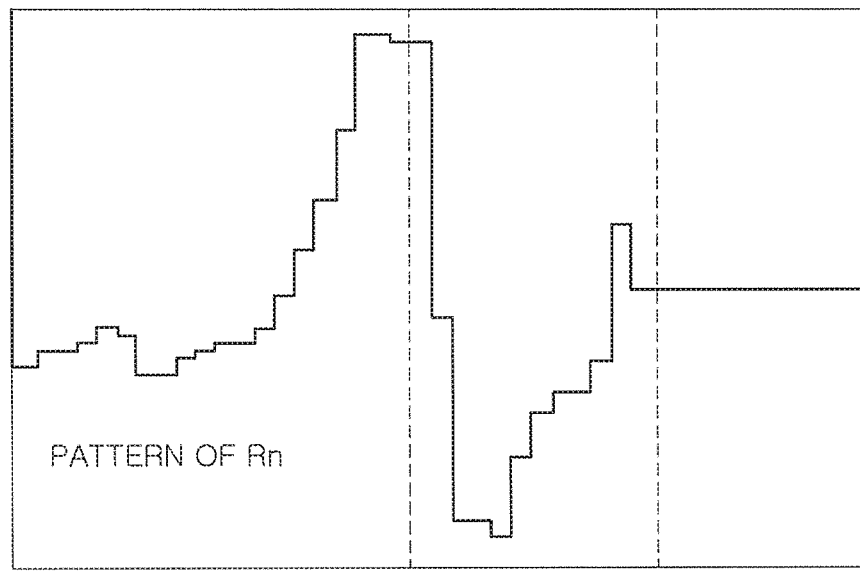
FIG. 5 is a graph showing a change aspect of another tooth period ratio based on a reverse rotation characteristic.
Figure 6:
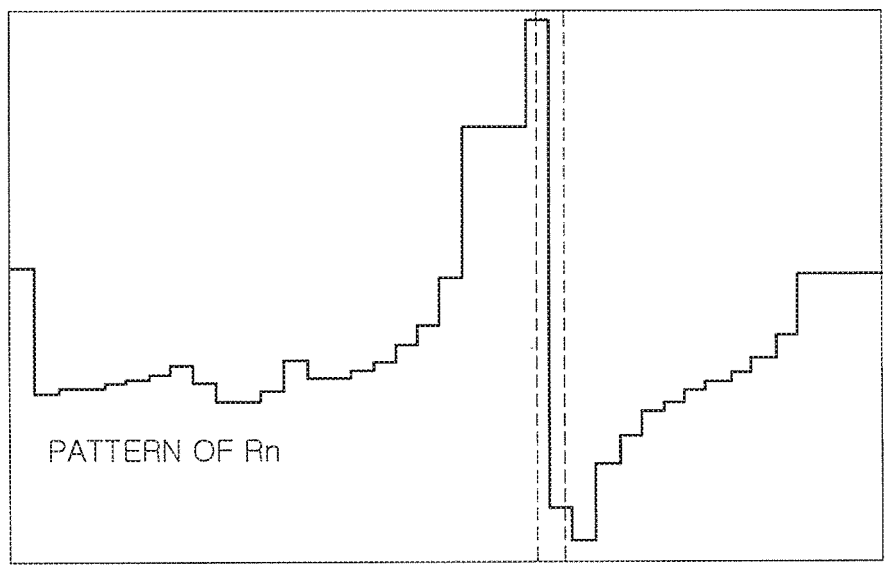
FIG. 6 is a graph showing a change aspect of further another tooth period ratio based on a reverse rotation characteristic.

FIG. 4 to FIG. 6 illustrate the changes in the tooth period ratio ($R_n$) based on the time during the reverse rotation of the engine.

FIG. 4 illustrates a change in the tooth period ratio ($R_n$) when the engine has reversely rotated for a short time period. As seen in FIG. 2, there is a reverse rotation wherein the direction change occurs at a time point which is less than ⅓ of the time between the falling edge of the pulse and the next falling edge.

According to the studies and tests by the inventors of the present disclosure, as illustrated in FIG. 4, when the engine reversely rotates for the short time period, a U-shaped change (U-type F) may be formed in such a way that the tooth period ratio rises ($R_{n+2}$), and then drops ($R_{n+1}$), and the tooth period ratio rises ($R_n$) again. This is due to the period rise during the reverse rotation and a pulse characteristic which may generate from the crankshaft detection sensor.

As illustrated in FIG. 5, if the engine reversely rotates for the medium and long time period, there may be a change of the type (Conti-F) wherein the tooth period ratio rises ($R_{n+2}$) and then drops ($R_{n+1}$), and the tooth period ratio continuously drops ($R_n$). As illustrated in FIG. 5, the reverse rotation for the medium time period may mean a reverse rotation wherein the direction change occurs at a time point which is greater than or equal to ⅓, but which is less than ⅔ of the time between the falling edge of the pulse and the next falling edge. As illustrated in FIG. 2, the long time period reverse rotation may mean a reverse rotation wherein the engine reversely rotate at a time point which is greater than or equal to ⅔, but which is less than 3/3 of the time between the falling edge of the pulse and the next falling edge.

As illustrated in FIG. 6, if the previous value $R_n$ is repeatedly over a predetermined value range, it may be determined as an occasion there would be a high possibility for the medium and long time periods to occur. If the recent value $R_O$ which was updated thereafter satisfies a predetermined value range, the rotation is immediately determined as a reverse rotation (Directly-F).

In the present disclosure, the size between the first updated recent tooth period ratio ($R_O$) and the previous tooth period ratio ($R_1$) are compared to each other (S16). As described earlier, the tooth period increases during the reverse rotation. Since the reverse rotation occurrence and characteristic thereof would change based on the sizes of the previous tooth period ($R_1$) and the recent tooth period ratio ($R_1$), it needs to classify them in order to carry out a corresponding control.

If the recently updated tooth period ratio ($R_O$) is smaller than the previous tooth period ratio ($R_1$), it is determined whether the previous and previous tooth period ratio ($R_2$), the recent tooth period ratio ($R_O$) and the previous tooth period ratio ($R_1$) have a predetermined size relationship (S170). If the previous tooth period ratio ($R_1$) is larger than the previous and previous tooth period ratio ($R_2$) and the recent tooth period ratio ($R_O$), and if the previous and previous tooth period ratio is larger than 1.0, it is doubted that there would be the reverse rotations for the short time period and long time period. In this case, the updated recent tooth period ratio ($R_O$) is stored in the buffer as a value $R_F$ (S180). This value would be used to determine the reverse rotation state and the pattern thereof based on the size relationship as compared to the newly updated tooth period ratio.

Next, the recent tooth periods ($t_n$) are continuously measured and are stored in the buffer of the ECU (S190). The tooth period ratio ($R_n$) is calculated from the updated tooth periods ($t_n$) (S200).

It is determined whether the value ($R_F$) has been stored in the buffer of the ECU. In the previous step, if the previous and previous tooth period ratio ($R_2$), the recent tooth period ratio ($R_O$) and the previous tooth period ratio ($R_1$) satisfy the predetermined size relationship set in the step (S170), since the previous tooth period ratio ($R_O$) has been stored in the buffer as the value ($R_F$), it is determined whether the value ($R_F$) stored in the buffer is over a predetermined value (1.0) (S220).

If the value ($R_F$) is over 1.0 or the value ($R_F$) is larger than the updated value ($R_O$), as illustrated in FIG. 5, there may exist a type (Conti-F) wherein the tooth periods are continuously decreased (S230). In this case, it is determined as an occasion wherein the reverse revolutions have already occurred for the medium time period or the long time period (S320).

If the value ($R_F$) is smaller than 1.0 or the updated value ($R_O$) is larger than the value ($R_F$), and the values ($R_F$) and ($R_O$) are in a specific range ($R_F$>0.5, $R_O$≤1) (S300), as illustrated in FIG. 4, the change in the size of the tooth period ratio may look like the U-shape (U-type F), it may be determined as an occasion wherein the engine has reversely rotated for the short time period (S330).

If it is determined that the recent tooth period ratio ($R_O$) is larger than or equal to the previous tooth period ratio ($R_1$), it is determined if the recent tooth period ratio ($R_O$) and the previous tooth period ratio ($R_O$) are over a predetermined value (1.5) (S280). If it is assumed that the crankshaft rotates at the equal velocity, n case where the reverse rotations have already occurred for the medium and long time periods, the recent tooth period may extend 1.5 times longer than in the previous tooth period before the reverse rotation has occurred. Therefore, if both the recent tooth period ratio ($R_O$) and the previous tooth period ratio ($R_O$) are over 1.5, it may be doubted that the reverse rotations have already occurred for the medium and long time periods.

In this case, the step for storing the recent tooth period ratio ($R_O$) as the value ($R_F$) may be omitted, and then the recent tooth period ($t_n$) is measured and stored (S190), and the tooth period ratio ($R_n$) would be calculated from the updated tooth periods ($t_n$) (S200).

In this case, since the stored value ($R_F$) does not exist, if the size of the updated recent value ($R_O$) satisfies a predetermined condition (S290), it may be directly determined that the reverse rotations have occurred for the medium or long time period (S310). Namely, since the change in the tooth period shows the type (Directly-F) as in FIG. 6, it would be determined that the reverse rotations have occurred for the medium and long time periods. The size of the recent value ($R_O$) has been set smaller than 0.9 or larger than 1 in the step (S90) for the purpose of more increasing accuracy in such a way to minimize the error during the process of the signals.

If it is determined that the reverse rotations have occurred for the short and medium time periods, the number of the reverse rotation judgments is counted (S250). If the reverse rotation occurs once, the counted number would be 1. If the reverse rotation judgment number is 2, namely, if the reverse rotation occurs twice, it means that the rotation direction of the engine has changed in the sequence "normal direction-→reverse rotation→normal direction". More specifically, it means that the rotation of the engine has returned back to the normal rotation. In this case, all the tooth periods ($t_n$) and the tooth period ratios ($R_n$) stored in the buffer are initialized, and then the reverse rotation judgment algorithm will proceed (S260).

If it does not need to activate the engine reverse rotation judgment algorithm, namely, if the rotation of the engine is completely stopped (stall) or after the engine is restarted, it does not need to proceed the engine rotation judgment algorithm, whereupon the measurement will be finished (S270).

The ECU is able to determine the rotation angle of the crankshaft based on the information related with the reverse rotation of the engine when the ISG device-mounted vehicle is stopped idle. Moreover, the ECU will effectively carry out the synchronization control of the engine in such a way to control the fuel supply device, for example, a fuel pump, a fuel injection nozzle, etc. and the combustion device, for example, an ignition plug, etc. using the above information, thus providing the combustion at the optimum timing.

A result of the comparison judgment between the conventional reverse rotation judgment method (a comparison example) wherein the reverse rotation state of the engine is determined using the tooth periods and the reverse rotation judgment method (the example of the present disclosure) according to the present disclosure will be described below.

First, if the normal direction is being carried out, a normal direction detection state between the conventional reverse rotation judgment algorithm and the reverse rotation judgment algorithm according to the present disclosure is compared, and a result thereof is shown in Table 1. For the simulation, the conventional reverse rotation judgment algorithm and the reverse rotation judgment algorithm according to the present disclosure were carried out using the ECU. The tests were carried out in such a way that the same sine waveforms were applied to the sensor more than 55 times. For the vehicle speed, the signals were applied in a state where the rotation speed of the engine was 20~495 rpm in case of the 3-cylinder engine, and it was 10~495 rpm in case of the 4-cylinder engine.

TABLE 1

| Number of cylinders | Example of the present disclosure | Comparison example | Remarks |
|---|---|---|---|
| 3 cylinders | Normal direction was always recognized | Reverse rotation was detected at about 28.5/37 rpm | Same test condition |
| 4 cylinders | Normal direction was always recognized | Reverse rotation was detected at about 25.5 rpm | |

As seen in Table 1, according to the example of the present disclosure, it was confirmed that the engine was rotating in the normal direction. As compared to this, according to the comparison example, in terms of the engine revolution, even though the engine was rotating in the normal direction, the conventional algorithm showed that the engine was rotating in the reverse direction.

Next, in case where the engine rotated in the sequence "normal direction→reverse direction→normal direction, the conventional reverse rotation judgment algorithm and the reverse rotation judgment algorithm were tested with respect to the reverse rotation detection efficiency. For the simulation, the conventional reverse rotation judgment algorithm and the reverse rotation judgment algorithm according to the present disclosure were carried out using the ECU. The tests were carried out in such a way that the same sine waveforms showing that the engine was rotating in the sequence "normal direction→reverse direction→normal direction" were applied to the sensor a couple of times. A result of the tests was shown in Table 2.

TABLE 2

| Number of cylinders | Example of the present disclosure | Comparison example | Remarks |
|---|---|---|---|
| 3 cylinders | 52 times detections/total 55 times | 49 times detection/total 55 times | Same test condition |
| 4 cylinders | 83 times detections/total 92 times | 11 times detections/total 92 times | |

As seen in Table 2, the present disclosure showed a good reverse rotation detection performance as compared to the comparison example. In particular, in case where the engine was the 4-cylinder, the reverse rotations were detected 83 times in total in 92 times of the tests, which showed that the present disclosure showed a good reverse rotation detection performance as compared to the conventional algorithm which showed 11 times detections of the reverse rotations.

Figure 7:
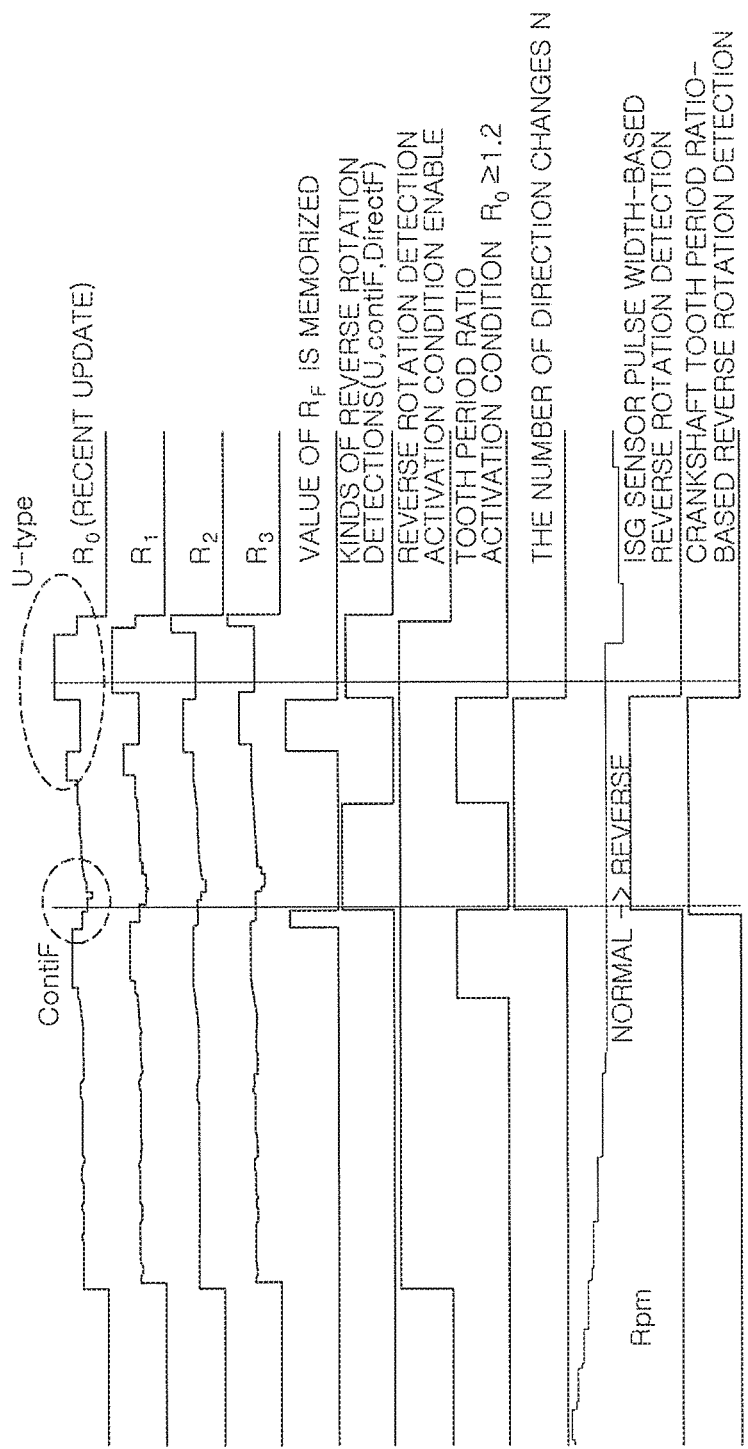
FIG. 7 is a graph showing a result of a detection after a method for sensing a reverse rotation of an engine is carried out according to the present disclosure.

FIG. 7 and FIG. 8 illustrate a result of the reverse rotation detections which were carried out using the reverse rotation detection algorithm according to the present disclosure.

As seen in FIG. 7, it shows a type (Conti-F) wherein the tooth period ratio continuously decreases when the rotation direction is changed from the normal direction to the reverse rotation, and a type (U-type F) wherein the change of the tooth period ratio decreases, and then increases when the rotation direction changes from the reverse rotation to the normal rotation.

As seen in FIG. 8, it shows the type (Directly F) of the tooth period ratio seen in FIG. 7 when the rotation direction changes from the normal rotation to the reverse rotation, and the type (U-type F) wherein the change of the tooth period ratio decreases, and then increases when the rotation direction changes from the reverse rotation to the normal rotation.

As illustrated in FIG. 7 and FIG. 8, it is confirmed that the reverse rotation of the engine can be accurately detected in such a way to observe any change aspect in the tooth period ratio.

While the present disclosure has been described with respect to the specific embodiments, it will be apparent to those skilled in the art that various changes and modifications may be made without departing from the spirit and scope of the disclosure as defined in the following claims.

What is claimed is:

1. A method for sensing a reverse rotation of an engine in a vehicle, wherein a pulse signal is received from a crankshaft angle detection sensor provided to detect a crankshaft angle of the engine and a reverse rotation state of the engine in the vehicle is determined based on a tooth period ratio between a falling edge and the next falling edge of the pulse signal, the method comprising:

detecting, by an electronic control unit (ECU), tooth period ratios using the crankshaft angle detection sensor and storing the detected tooth period ratios in a buffer of the ECU;

calculating, by the ECU, a first tooth period ratio which is a ratio between a first measured tooth period and a previous tooth period measured just before the first measured tooth period;

determining, by the ECU, whether a value of the first tooth period ratio is greater than a first reference value;

updating, by the ECU, a tooth period value, which is stored in the buffer previously by measuring a second tooth period, when the first tooth period ratio is greater than the first reference value;

calculating, by the ECU, a second tooth period ratio using a value of e second tooth period; and determining, by the ECU, the reverse rotation state of the engine by checking whether a change between the first tooth period ratio and the second tooth period ratio shows a predetermined pattern.

2. The method of claim 1, further comprising:
determining whether or not a reverse rotation detection of the engine is activated based on a rotational speed of the engine, a vehicle speed, and an engine start state.

3. The method of claim 1, further comprising:
completing a reverse rotation detection of the engine based on a rotational speed of the engine and an engine start state.

4. The method of claim 1, wherein the step of determining the reverse rotation state of the engine comprises:

determining whether there exists a section in which values of the first and second tooth period ratios rise and then drop over time and storing a value of dropped tooth period ratio;

updating the tooth period value stored previously in the buffer by measuring again a third tooth period and calculating a third tooth period ratio using the third tooth period value; and determining that when a value of the third tooth period ratio is larger than the value of the second tooth period ratio, the engine has a short time period reverse rotation, wherein a direction change occurs at a time point which is less than one-third of time between the falling edge of the pulse signal and the next falling edge thereof.

5. The method of claim 4, further comprising, when it is determined that the engine has the reverse rotation:

counting a number of reverse rotations; and determining whether or not the number of the reverse rotations is greater than 2 and determining whether or not the engine has the reverse rotation by initializing the values of the first, second, and third tooth period ratios stored in the buffer when the number of the reverse rotations is greater than 2.

6. The method of claim 1, wherein the step of determining the reverse rotation state of the engine further comprises:

determining whether or not there exists a section in which values of the first and second tooth period ratios rise and then drop over time and storing a dropped tooth period ratio;

updating the tooth period value stored previously in the buffer by measuring again a fourth tooth period and calculating a fourth tooth period ratio using the updated tooth period value; and determining that when a value of the fourth tooth period ratio is smaller than a value of the third tooth period ratio, the engine has a medium time period reverse rotation, wherein a direction change occurs at a time point which is greater than or equal to one-third, but which is less than two-thirds of the time between the falling edge of the pulse signal and the next falling edge thereof or the engine as a long time period reverse rotation, and wherein a direction change occurs at a time point which is greater than or equal to two-thirds, but which is less than a time point between the falling edge of the pulse signal and the next falling edge thereof.

7. The method of claim 6, further comprising, when it is determined that the engine has the reverse rotation:

counting a number of reverse rotations; and determining whether or not the number of the reverse rotations is greater than 2 and determining whether or not the engine has the reverse rotation by initializing the values of the first, second, third, and fourth tooth period ratios stored in the buffer when the number of the reverse rotations is greater than 2.

8. The method of claim 1, further comprising:

determining whether or not the updated second tooth period ratio and the first tooth period ratio are greater than a second reference value;

updating the tooth period value stored previously in the buffer by measuring again a third tooth period if the second tooth period ratio and the first tooth period ratio are larger than the second reference value and calculating a third tooth period ratio using the updated tooth period value; and determining that when the newly updated recent tooth period ratio is smaller than a third reference value or is equal to or larger than a fourth reference value, a medium time period or long time period reverse rotation occurs.

9. The method of claim 8, wherein the step of determining the medium time period or long time period reverse rotation occurs further comprising: determining that when the newly updated recent tooth period ratio is larger than a fourth reference value, the medium time period or long time period reverse rotation occurs.

\* \* \* \* \*